United States Patent [19]

Franzolini

[11] 4,355,342
[45] Oct. 19, 1982

[54] POWER CIRCUIT INCLUDING MEANS FOR AUTOMATICALLY PROTECTING A CHOPPING TRANSISTOR THEREOF

[75] Inventor: Luciano Franzolini, Milan, Italy

[73] Assignee: Sp. El. s.r.l., Milan, Italy

[21] Appl. No.: 113,234

[22] Filed: Jan. 17, 1980

[30] Foreign Application Priority Data

Jan. 30, 1979 [IT] Italy .............................. 19751 A/79

[51] Int. Cl.$^3$ .............................................. H02H 3/20
[52] U.S. Cl. .................................... 361/91; 318/341; 361/101
[58] Field of Search ...................... 361/55, 91, 101, 86; 318/341, 345 E, 345 F

[56] References Cited

U.S. PATENT DOCUMENTS

| | | | |
|---|---|---|---|
| 3,493,815 | 2/1970 | Hurtle | 361/55 |
| 4,006,370 | 2/1977 | Erler | 361/91 X |
| 4,126,889 | 11/1978 | Ibamoto et al. | 318/341 X |
| 4,217,526 | 8/1980 | Farr | 318/341 |

Primary Examiner—Harry E. Moose, Jr.

Attorney, Agent, or Firm—Karl F. Ross

[57] ABSTRACT

A chopping transistor connected across a d-c power supply, in series with a load such as a motor, has its base connected to an output of an oscillator generating a train of voltage pulses $V_1$ by which that transistor is alternately turned on and off. A threshold sensor emits a series of monitoring pulses $V_2$ of the same polarity as the conduction-establishing control pulses $V_1$ when the collector/emitter voltage of the transistor surpasses a certain limit; the joint appearance of signals $V_1$ and $V_2$ at respective inputs of an AND gate gives rise to an off-normal signal $V_3$ which, if of extended duration, passes a delay circuit to act as an alarm signal $V_4$. A memory tripped by that alarm signal emits a permanent disconnect signal $V_5$ which either blocks the oscillator or fires a thyristor in shunt with the transistor whereby a fuse in series therewith is blown. The transistor may be one of four such transistors inserted in respective arms of a bridge, with two oscillators each driving a pair of these transistors and a common fuse in series with both pairs.

2 Claims, 4 Drawing Figures

POWER CIRCUIT INCLUDING MEANS FOR AUTOMATICALLY PROTECTING A CHOPPING TRANSISTOR THEREOF

FIELD OF THE INVENTION

My present invention relates to power circuits including a so-called chopping transistor in series with a load and means for automatically protecting that transistor.

BACKGROUND OF THE INVENTION

Such power circuits are especially useful in switching converters or the like for the purpose of insuring that, in the case of accidental short circuiting, the chopping transistor is protected. It is well known that apparatuses of the switching type for supplying electric motors with direct current or alternating current are very critical as regards protection against internal or external short circuits or similar anomalous operating conditions.

In fact, as is well known, the current gain of the transistor tends towards 1 with an increase in the current passing through the transistor; thus, if the current I between the collector and the emitter is strongly increased and the voltage $V_{ce}$ between the collector and the emitter tends to increase, the possibility exists of the transistor being destroyed through the excess of power dissipated.

There are essentially two known systems which are principally used for protecting transistors, the first employing means for sensing the maximum current which flows upon short circuiting while the second employs magnetic sensing. In the first case, the increase in current which occurs with the short circuit is sensed by a precision threshold sensor or trigger whose response generates the signal which blocks the converter. This system, to be effective, must discriminate between the two working levels, that is, the level of normal operation and the level of overcurrent which occurs in the case of short circuiting. In practice, the two levels are separated by at least 20% to allow for possible errors due to the tolerances of the circuit components; this involves the disadvantage of a reduced utilization of the power elements including the transistors, in order to provide the required safety margin, or else the sensing circuit has to be very precise, rapid and stable and consequently very complicated and expensive.

In the second case the magnetic sensing of the abnormal condition causes blocking of the control circuit of the transistor, but this system has the disadvantage either of requiring the use of very expensive external magnetic sensing elements or of not being effective in the case of very slow phenomena and of suffering from possible external capacitive disturbances.

OBJECT OF THE INVENTION

The object of my present invention is to eliminate the disadvantages mentioned above and to insure effective protection of the transistor, allowing it to work at the maximum power for which it is designed.

SUMMARY OF THE INVENTION

A power circuit according to my invention comprises a chopping transistor connected in series with a load (e.g. a motor) across a supply of direct current, this transistor having an emitter connected to one supply terminal and having a base connected to an output of an oscillator which generates a train of control pulses whereby that transistor is periodically rendered conductive. The collector of the transistor is connected to threshold means emitting a train of monitoring pulses of the same polarity as the control pulses whenever the collector/emitter voltage exceeds a predetermined limit during the periods of transistor cutoff. This limit, however, is so chosen as to be also exceeded by a collector/emitter voltage occurring during conduction of the transistor in the event of an accidental short-circuiting of the load. The oscillator output and the threshold means are connected to respective inputs of an AND gate which emits an off-normal signal whenever a control pulse coincides with a monitoring pulse of the same polarity. This AND gate is connected to delay means designed to suppress spurious transients and to emit an alarm signal only in the presence of an off-normal signal having at least a predetermined minimum duration which, however, is less than the width of a control pulse. A memory connected to the delay means generates a permanent disconnect signal upon being tripped by such an alarm signal, the disconnect signal being applied to disabling means serving to cut off the transistor in the case of an accidental short circuit.

According to one embodiment of my invention, the disabling means comprises a blocking input of the oscillator which thus discontinues the emission of control pulses in response to the disconnect signal.

In accordance with another embodiment, the disabling means comprises a fuse in series with the transistor and its load, in combination with switch means shunting the transistor for short-circuiting the latter with resulting blowing of the fuse in the presence of the disconnected signal.

BRIEF DESCRIPTION OF THE DRAWING

The above and other features of my invention will now be described by way of example with reference to the accompanying drawing in which.

DETAILED DESCRIPTION

Figure 1:
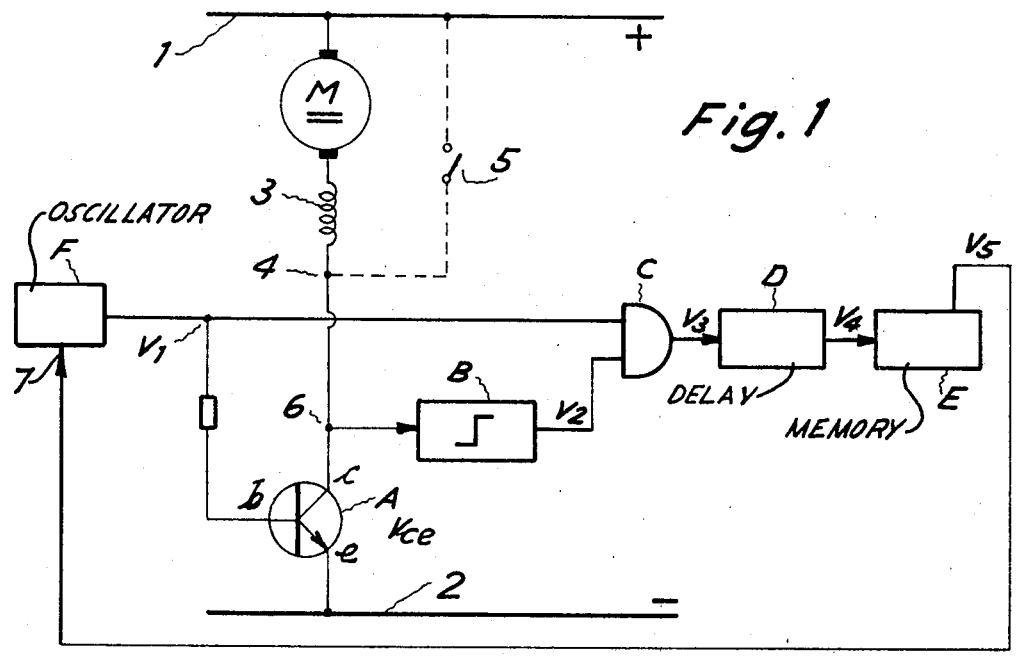
FIG. 1 is a block diagram of a power circuit according to the invention.

FIG. 1 shows a power circuit which is disposed between line conductors 1 and 2 and which includes an external current-consuming load such as a motor M supplied with direct current through an external impedance 3 (shown as an inductance) having a terminal 4; between the terminal 4 and the conductor 1 a symbolic connection with a switch 5 is indicated in broken lines to show a possible short circuit.

A chopping transistor A of NPN type is connected in series with the motor M and has its collector c connected to the terminal 4, its emitter e being connected to the negative line 2. The transistor A is controlled by a pulse train $V_1$ supplied by an oscillator F to the base b of the transistor. A junction 6 lying between the terminal 4 and the collector c is connected to a threshold sensor or trigger B which in operation determines whether the voltage $V_{ce}$ between the collector and the emitter is at a minimum; if this voltage exceeds a predetermined threshold value, normally during periods of transistor cutoff in the absence of control pulses $V_1$, trigger B emits a positive monitoring pulse $V_2$. The circuit includes an AND gate C having one input connected to the oscillator and another input connected to the output of the trigger B; when the positive control and monitoring pulses $V_1$, $V_2$ coincide, a positive off-normal signal $V_3$ is emitted from the AND gate C. Connected to the output of the AND gate is a delay device D which, on receiving the signal $V_3$, suppresses spurious transients of brief duration due to the switch-over of the transistor A; in the case of off-normal signals $V_3$ outlasting the rated delay of device D, the signals are not eliminated and appear in the form of a positive alarm signal $V_4$ at the output of the delay device D connected to a memory E. The output of the memory E is normally low (or even zero) but becomes a positive signal $V_5$ in the presence of a positive disconnect signal $V_4$.

The output of the memory E is connected to a blocking input 7 of the oscillator F whose output serves to control the power transistor A. The oscillator F becomes blocked if the signal $V_5$ supplied from the memory E goes positive. The functioning of the power circuit of FIG. 1 is as follows, with reference also to FIG. 2. In normal operation, the transistor A may be in a condition of temporary cutoff or of conduction. In the first case, voltage $V_1 = 0$, $V_{ce}$ is positive and $V_2$ is positive, but voltages $V_3$, $V_4$ and $V_5$ are zero, as can be seen in the left-hand part of FIG. 2 labeled "OFF". In an intermediate stage denoted by the symbol "INT", as $V_{ce}$ is able to assume any vlaue and is in a transient stage of brief duration, protection is absent but, because the delay device D is provided, the short signals $V_3$ of less than the rated duration are ineffectual. In normal operation with the transistor A in the conducting condition denoted by the word "ON" in FIG. 2, the voltage $V_1$ at the base of the transistor A is positive, the collector/emitter voltage $V_{ce}$ is at a minimum below the voltage threshold $V_S$ of the trigger B so that its output voltage $V_2$ is zero, and the voltages $V_3$, $V_4$ and $V_5$ are likewise zero. As will be apparent from graph (d) of FIG. 2, the AND gate C emits a positive signal $V_3$ of brief duration at every descending flank of voltage $V_{ce}$; this signal, however, is not sensed by the memory E because the delay device D passes only a longer signal whose duration is greater than the changeover time between cutoff and conduction of the transistor A.

Figure 2:
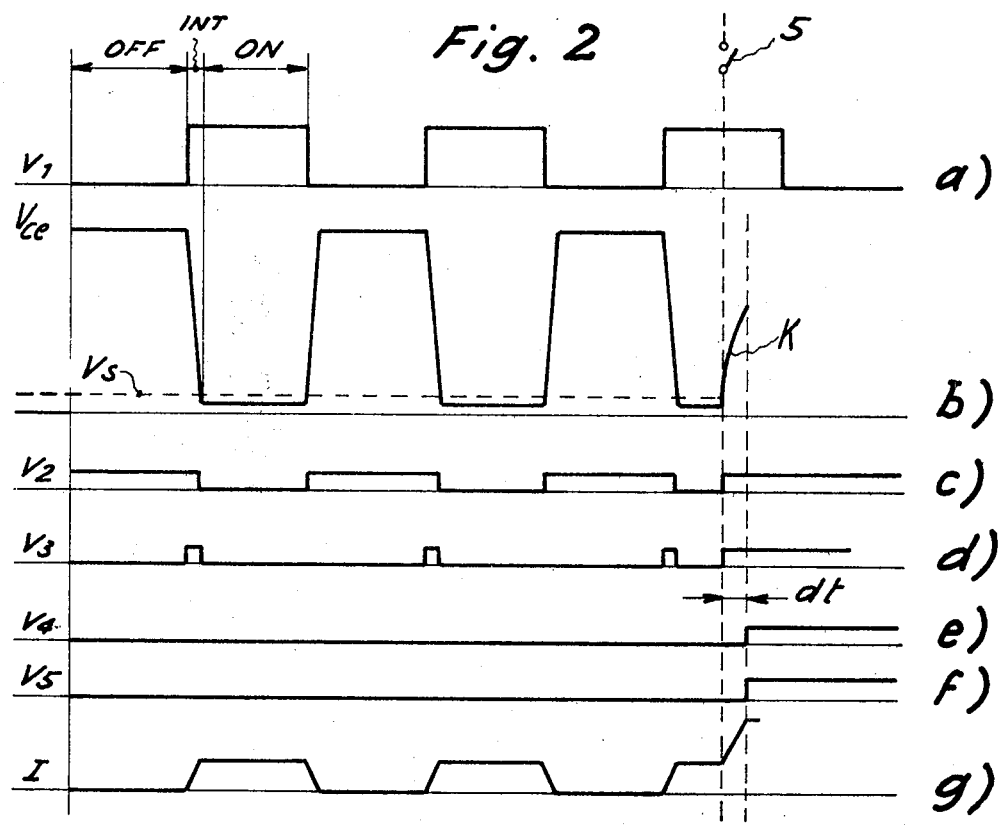
FIG. 2 shows graphs of the variation in voltages at various points both during normal operation and in the case of a short circuit.

In the case of a short circuit, indicated in FIG. 2 by a vertical broken line which includes the symbolic short-circuiting switch 5 and is shown to occur in the worst condition, that is with the transistor A conducting, the voltage $V_{ce}$ rises rapidly as indicated by the curve K in graph (b) because the current I shown in graph (g) has sharply increased the voltage drop between the collector and the emitter.

This increase exceeds the threshold level $V_S$ of the trigger B, generating a positive signal $V_2$ at the output thereof. At this point, with $V_1$ and $V_2$ simultaneously positive, a positive signal $V_3$ is generated at the output of the AND gate C which, by exceeding the delay of device D, generates at its output a positive signal $V_4$; this in turn unblocks the memory E and causes after a short time interval dt the continuous emission of positive voltage $V_5$, thus blocking the oscillator F with consequent cutoff of the transistor. It will be noted that the delay dt is less than the width of a control pulse shown in graph (a).

Figure 3:
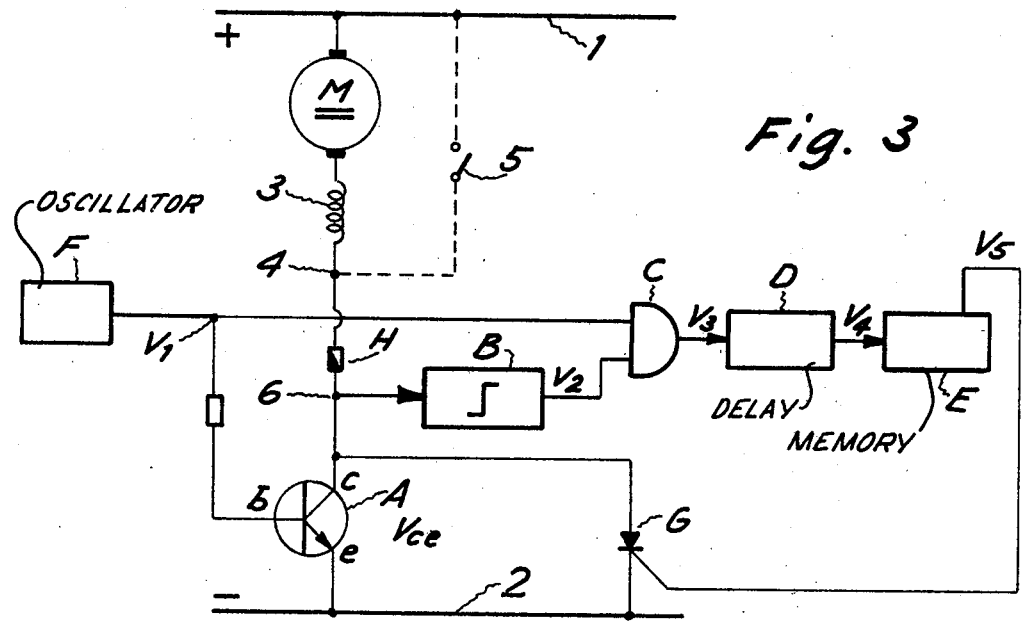
FIG. 3 is a variant of the circuit of FIG. 1 with an ultra-rapid fuse in series with the emitter and collector terminals of a protected transistor and a controlled rectifier or thyristor in parallel therewith.

According to the embodiment shown in FIG. 3, an ultra-rapid fuse H is arranged in series with the transistor A while a controlled rectifier or thyristor G is arranged in parallel with the transistor, i.e. is connected across the collector c and the emitter e. The output of the memory E is connected to the control electrode of the thyristor G instead of to the input of the oscillator F as shown in FIG. 1. When an anomaly occurs, the signal $V_5$ emitted from the memory E triggers the controlled rectifier G which in turn causes a sustained short circuit by blowing the ultra-rapid fuse H with a consequent breaking of the circuit and protection of the transistor.

Figure 4:
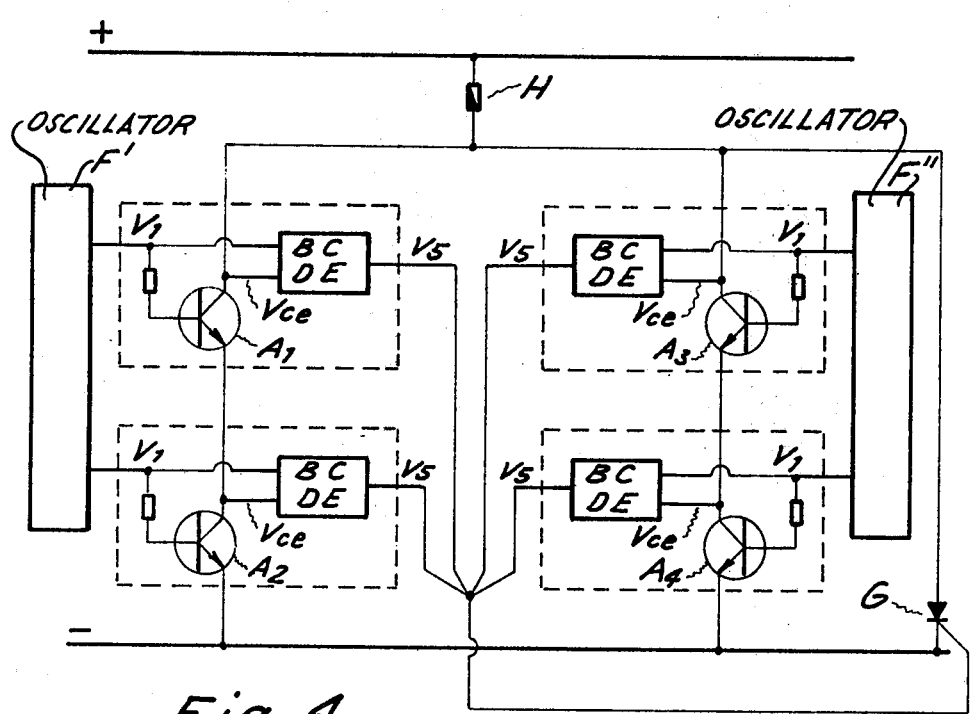
FIG. 4 shows a system of transistors arranged in a bridge circuit connected in series with a single fuse and in parallel with a single controlled rectifier or thyristor.

FIG. 4 shows two pairs of transistors $A_1$, $A_2$ and $A_3$, $A_4$, two oscillators F', F" (one for each transistor pair), an ultra-rapid fuse H and a controlled rectifier G. One terminal of the fuse H is connected to the collectors of transistors $A_1$, $A_3$. The collectors of the transistors $A_2$, $A_4$ are respectively connected to the emitters of the transistors $A_1$, $A_3$. The controlled rectifier or thyristor G is connected across the collectors of the transistors $A_1$, $A_3$ and the emitters of the transistors $A_2$, $A_4$. The transistors form a plurality of cells, each indicated in the Figure by a box in broken lines and shown to include the basic components B, C, D, E of FIGS. 1 and 2, with the output voltage $V_5$ of each cell supplied to the control electrode or gate of the thyristor G. The cells are connected to the supply leads 1, 2 via the ultra-rapid fuse H which lies in series with a bridge diagonal shunted by thyristor G. If, through any anomaly, any one of the cells emits a positive signal $V_5$, the controlled rectifier G is triggered and short-circuits the supply line with consequent blowing of the ultra-rapid fuse H and breaking of the circuit. The load to be energized via transistors $A_1$–$A_4$ has not been illustrated.

The embodiments of my invention particularly described and illustrated operate with NPN transistors and positive logic, but it will be appreciated that other types of transistors and logic may be used instead.

What is claimed is:
1. A power circuit comprising:
a chopping transistor connected in series with a load across a supply of direct current, said transistor having a collector connected to the load, an emitter connected to a terminal of said supply and a base;
an oscillator having an output connected to said base and further having a blocking input, said oscillator generating a train of control pulses periodically rendering said transistor conductive;
threshold means connected to said collector for emitting a train of monitoring pulses of the same polarity as said control pulses in response to the collector/emitter voltage exceeding a predetermined limit during periods of cutoff of said transistor, said limit being also exceeded by a collector/emitter voltage occurring during conduction of said transistor upon an accidental short-circuiting of the load;
an AND gate with inputs connected to the oscillator output and to said threshold means for emitting an off-normal signal in response to coincidence of a control pulse with a monitoring pulse;
delay means connected to said AND gate for suppressing spurious transients and emitting an alarm signal only in the presence of an off-normal signal of at least a predetermined minimum duration which is less than the width of a control pulse; and memory means connected to said delay means for delivering a permanent disconnect signal to said blocking input upon being tripped by said alarm signal, thereby disabling said oscillator and preventing further conduction of said transistor.

2. A power circuit comprising:

a chopping transistor connected in series with a load across a supply of direct current, said transistor having a collector connected to the load, an emitter connected to a terminal of said supply and a base;

an oscillator having an output connected to said base, said oscillator generating a train of control pulses periodically rendering said transistor conductive;

threshold means connected to said collector for emitting a train of monitoring pulses in response to the collector/emitter voltage exceeding a predetermined limit during periods of cutoff of said transistor, said limit being also exceeded by a collector/emitter voltage occurring during conduction of said transistor upon an accidental short-circuiting of the load;

gate means with inputs connected to the oscillator output and to said threshold means for emitting an off-normal signal in response to coincidence of a control pulse with a monitoring pulse;

delay means connected to said gate means for suppressing spurious transients and emitting an alarm signal only in the presence of an off-normal signal of at least a predetermined minimum duration which is less than the width of a control pulse; and memory means connected to said delay means for applying a permanent disconnect signal to a blocking input of said oscillator upon being tripped by said alarm signal, thereby terminating the generation of said control pulses and preventing further conduction of said transistor.

* * * * *